Oct. 13, 1925.
E. H. WRAY
1,556,741
CONTOUR MILLING MACHINE
Filed Feb. 13, 1924
3 Sheets-Sheet 1
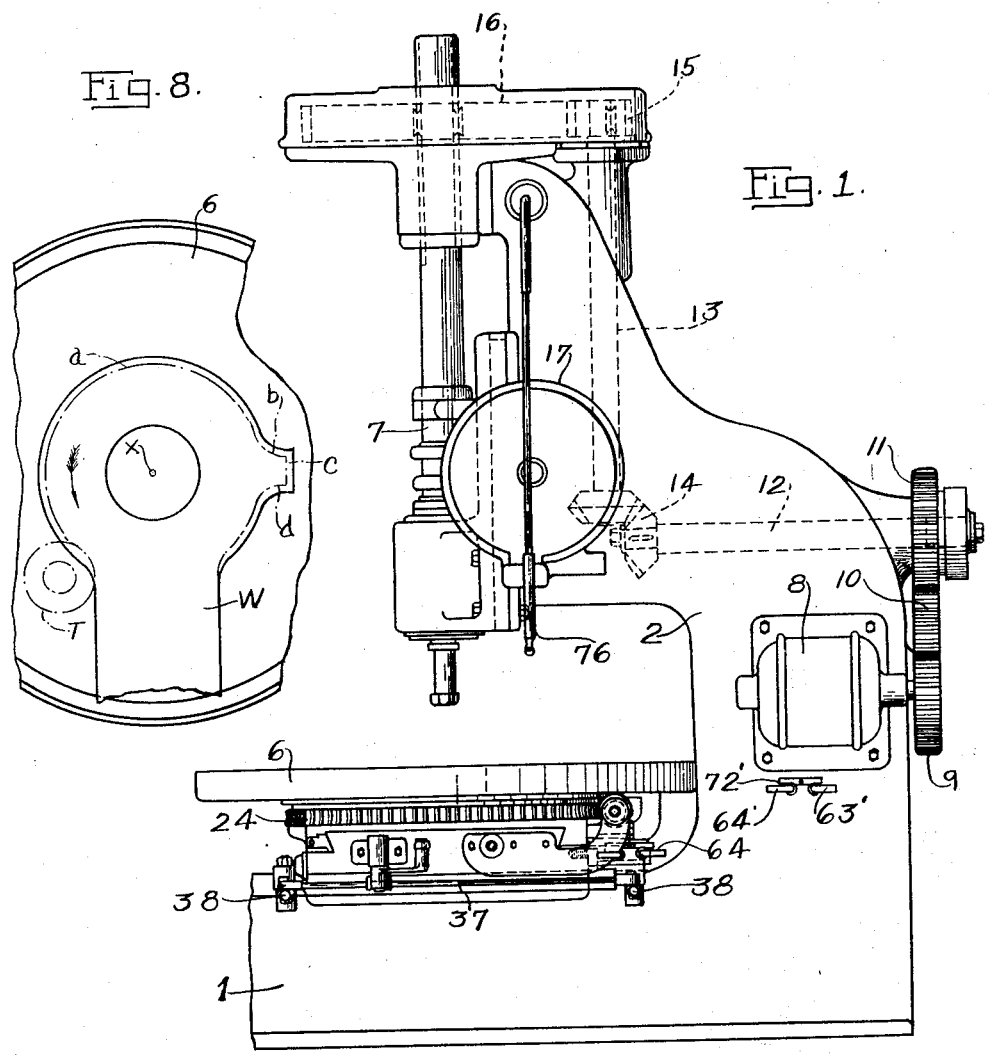
INVENTOR.
E. H. Wray.
BY
ATTORNEY

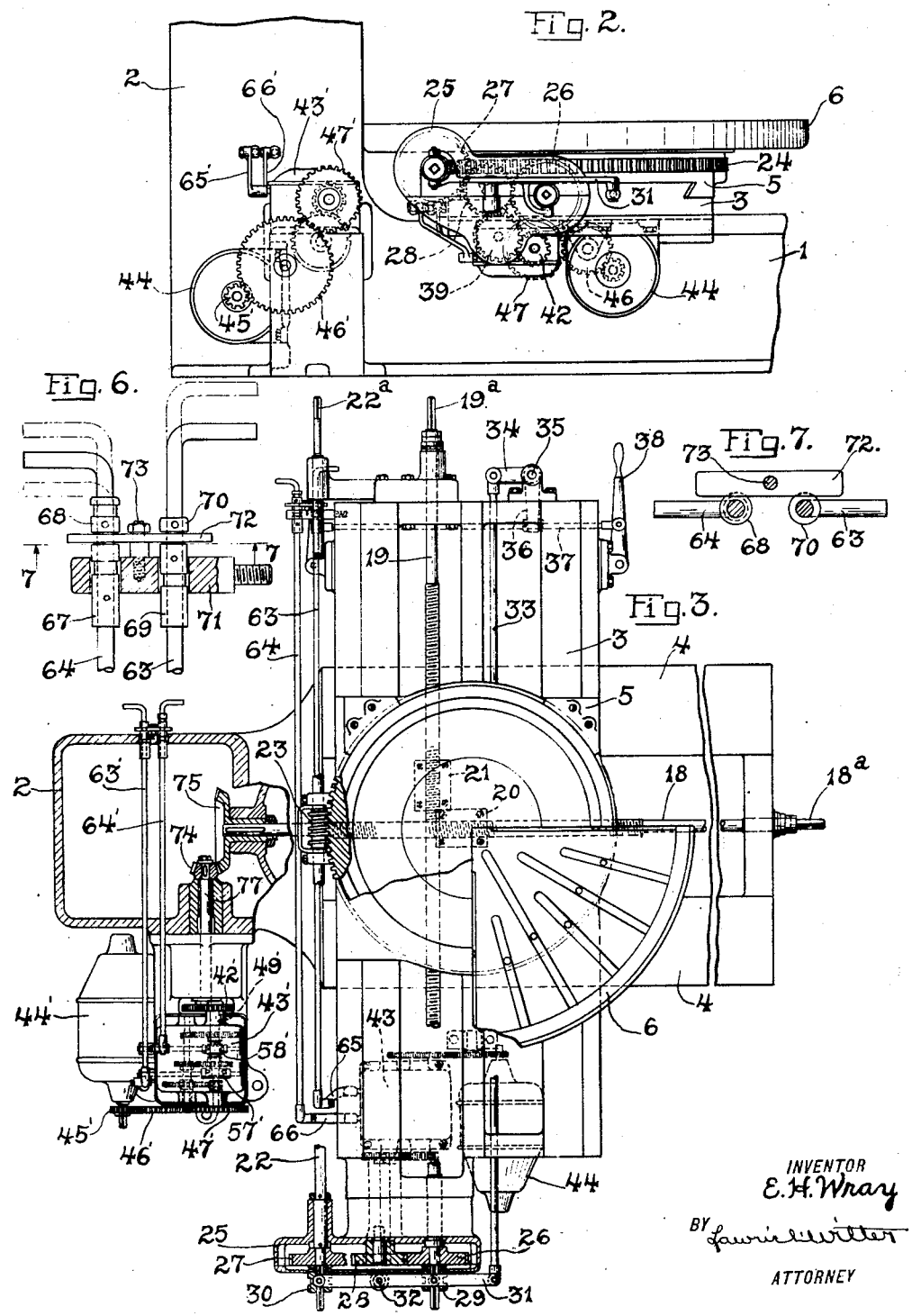

Oct. 13, 1925.

E. H. WRAY 1,556,741

CONTOUR MILLING MACHINE

Filed Feb. 13, 1924  3 Sheets-Sheet 3

INVENTOR
E. H. Wray.
BY
ATTORNEY

Patented Oct. 13, 1925.

1,556,741

UNITED STATES PATENT OFFICE.

EDWARD H. WRAY, OF PHILADELPHIA, PENNSYLVANIA, ASSIGNOR TO NILES-BEMENT-POND COMPANY, OF NEW YORK, N. Y., A CORPORATION OF NEW JERSEY.

CONTOUR-MILLING MACHINE.

Application filed February 13, 1924. Serial No. 692,527.

*To all whom it may concern:*

Be it known that I, EDWARD H. WRAY, a citizen of the United States, residing at Philadelphia, in the county of Philadelphia and State of Pennsylvania, have invented certain new and useful Improvements in a Contour-Milling Machine, of which the following is a specification.

This invention relates to machine tools and particularly to a vertical milling machine of the type illustrated in the accompanying drawings. In machines of this type, the relative lateral feeding movements between the tool and work are accomplished entirely by moving the work table which is so mounted as to have both rotary and rectilinear movements. A slotter having a work table mounted in this manner is shown in a copending application Serial No. 480,841 to W. J. Hagman. The primary object of the present invention is to provide an improved mechanism of this type wherein means including an electric motor or motors is provided for more efficiently operating and controlling the movements of the work support for both feeding and traversing.

In the machine as illustrated, the work support comprises a saddle slidable on the bed, a slide on the saddle, a rotary table on the slide, and means including two screws and a shaft for giving the saddle, slide and table their respective movements. It is an object of the invention to provide improved operating means for these work supports, such means including an electric motor or motors and change speed gearing for operating the said screws and shaft and means at the front of the machine for controlling both the motors and change speed gearing.

In its more specific embodiment as illustrated, the machine comprises a motor and change speed gearing for operating the saddle screw, a motor and change speed gearing for operating the slide screw and rotary table shaft, and means at the front of the machine for shifting the change speed gearing and controlling the motors. The change speed gearing provides low gear ratios for moving the work supports at feeding speeds and a high gear ratio for moving the work supports at traversing speed. It is another object of the invention to provide an improved mechanism of this general construction.

With the above and other objects in view, my invention consists in the features of construction and operation set forth in the following specification and illustrated in the accompanying drawings. In such drawings annexed hereto and forming a part of this specification, I have shown one embodiment of my invention in a vertical milling machine but it will be understood that the invention can be otherwise embodied and that the drawings are not to be construed as defining or limiting the scope of the invention, the claims appended to this specification being relied upon for that purpose.

Referring to the figures of the drawings:

Figure 1 is a front elevation of my improved vertical milling machine.

Fig. 2 is a fragmentary rear elevation thereof.

Fig. 3 is a plan view thereof.

Fig. 6 is a fragmentary detail view of the clutch shifting mechanism.

Fig. 7 is a detail view taken on line 7—7 of Fig. 6.

Fig. 8 is a diagrammatic view illustrating certain milling operations performed by the machine illustrated herein.

Figure 4:
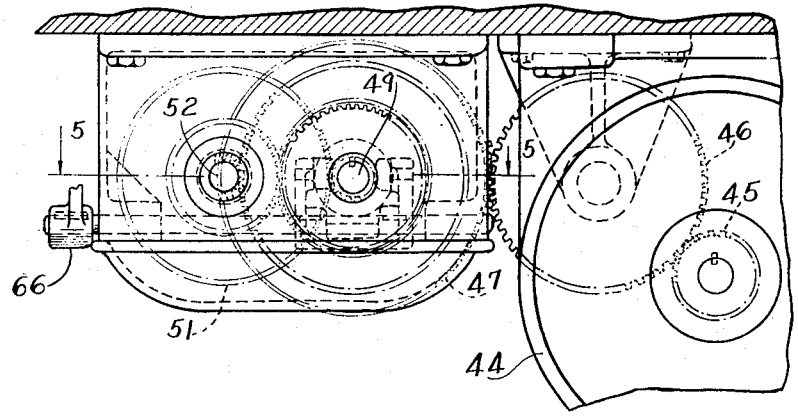
Fig. 4 is an enlarged fragmentary view of Fig. 2.

As heretofore stated, the relative lateral feeding movements between the tool and work are accomplished entirely by moving the work supports. The saddle provides a straight line movement in one direction, the slide provides a straight line movement in a relatively right angular direction, and the table provides a rotary movement. To perform the milling operations required, the operator must be able to control these movements with great accuracy. As illustrated in the drawings, a motor and change speed gearing are provided for operating the saddle and another motor and change speed gearing are provided for optionally operating the slide and table. Means are provided at the front of the machine for shifting the change speed gearing whereby to obtain the feeding or traversing speed desired and other means, as the portable switch illustrated, is provided for accurately controlling the operation of both motors. The specific mechanism illustrated in the drawings will now be described.

In the drawings, 1 indicates the bed and 2 the upright or column of my improved vertical milling machine. A saddle 3 is slidably mounted on the ways 4 of the bed. A slide 5 is movable on the saddle at right angles to the saddle movement and a work table 6 is rotatably mounted on the slide. A vertical tool spindle 7 is rotatably mounted on the column over the table and is adapted to be rotated from a motor 8 through gears 9, 10 and 11, shafts 12 and 13 connected by bevel gears 14 and a pinion 15 on shaft 13 meshing with a gear 16, the spindle being splined for axial movement in the gear 16. The spindle can be adjusted axially by mechanism within a casing 17.

The saddle 3 and slide 5 are moved respectively by means of screws 18 and 19 threadedly engaging nuts 20 and 21 on the saddle and slide respectively. The table 6 is rotated by a shaft 22 having a worm 23 splined thereon and meshing with a worm gear 24 on the table. The screw shaft 19 and shaft 22 extend rearwardly parallel with the ways on the saddle and into a gear box 25 mounted on the rear end of the saddle. The forward ends of shafts 18, 19 and 22 are squared at 18$^a$, 19$^a$ and 22$^a$ whereby the same can be rotated manually.

Gears 26 and 27, driven from an idler gear 28 within the gear box 25 are loosely mounted respectively on shafts 19 and 22. Clutches 29 and 30 respectively splined to these shafts are adapted to operatively connect either gear to its shaft. A yoke 31 engaging the clutches at its ends and pivoted at 32 is adapted to be operated by a clutch rod 33 extending to the front of the machine where it is connected to one arm 34 of a bell crank pivoted at 35. The other arm 36 of this crank is connected to a rod 37 having operating handles 38 at its ends. A gear 39 on a shaft 40 meshes with the idler gear 28 and a gear 41 on the inner end of shaft 40 meshes with a pinion 42 on the end of a shaft 49 within a gear box 43.

Figure 5:
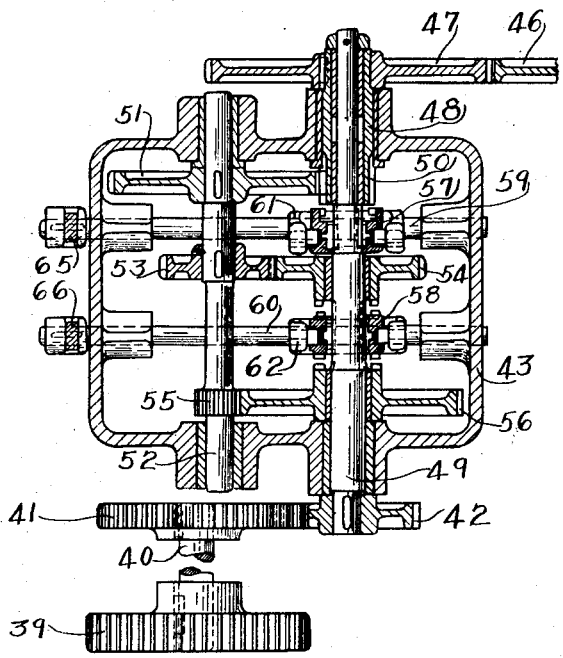
Fig. 5 is an enlarged horizontal sectional view through the gear box, approximately on line 5—5 of Fig. 4.

The slide and table operating shafts 19 and 22 are adapted to be driven by a motor 44 operating through change speed gearing within the gear box 43 and the saddle operating screw shaft 18 is adapted to be driven by a motor 44' operating through change speed gearing within a gear box 43', these two driving units being substantially identical. Such construction greatly facilitates the manufacture and simplicity of operation of the machine. The gearing shown in Figs. 4 and 5 and adapted to drive the shafts 19 and 22 will now be described.

The motor 44 and gear box 43 are bolted to the under side of the saddle at the rear end thereof. A pinion 45 on the motor shaft meshes with an idler gear 46 in turn meshing with a gear 47 secured to a sleeve 48 loose on a transmission shaft 49 within the gear box. The inner end of sleeve 48 is provided with pinion teeth 50 in mesh with a large gear 51 keyed on a shaft 52 parallel with the shaft 49. A similar gear 53 keyed to shaft 52 is in mesh with a gear 54 loose on the shaft 49 and a pinion 55 on shaft 52 is in mesh with a large gear 56 also loose on shaft 49. A clutch 57 splined to the shaft 49 can be engaged with the sleeve 48 and a double clutch 58 splined to the shaft 49 can be engaged with either of gears 54 or 56. The driving pinion 42 can therefore be driven directly at high speed from the motor through the clutch 57 or at either of two lower speeds through the clutch 58.

Extending transversely within the box 43 are two rock shafts 59 and 60 respectively having yokes 61 and 62 mounted thereon and in engagement with clutches 57 and 58. Rods 63 and 64 connected respectively to these rock shafts through arms 65 and 66 extend to the front of the machine whereby the operator can shift the clutches from his usual operating position. As shown in Figs. 6 and 7 an interlock is provided for preventing the simultaneous engagement of these clutches. A pair of grooved collars 67 and 68 are pinned in spaced relation on the rod 64. A grooved collar 69 and a plain collar 70 are pinned in spaced relation on the rod 63. The rods extend through a bracket 71 secured to the saddle and a bar 72 is pivoted on the bracket at 73 intermediate the rods. The construction is such that when either clutch is in an engaged position, the other clutch must be in its disengaged or neutral position. The bar engages within the grooves of the collars on one rod to hold the clutches in their engaged position and in the space between the collars on the other rod to hold the cluutches in the disengaged position. But one rod can therefore be moved at any one time, and before the other rod can be moved the bar 72 must be moved manually to its opposite engaged position.

The mechanism driven from the motor 44' and within the box 43' is the same as that just described, like parts thereof being designated by the same reference characters primed. A bevel pinion 74 however is mounted on a shaft 77 driven from a gear 42' on the transmission shaft 49' and is in mesh with a bevel gear 75 on the screw 18. The clutches 57' and 58' are shifted respectively by rods 63' and 64' extending through and to the front of the column 2.

Any convenient switch arrangement can be provided for controlling the motors. I prefer however that this, as well as all the manually operating and controlling parts of the machine, shall be located directly adjacent the operator's usual position at the machine. As shown in Fig. 1, I hang a pendent switch 76 from the column 2 in such manner that the switch is normally located adjacent the front of the machine within easy reach of the operator. Furthermore, the flexible mounting of the switch on the column permits the operator to carry the same with him and thus control the operation of the machine from any position about the work table. It will of course be understood that the switch is operative to independently control both motors.

Considerable of the work to be performed on the machine illustrated herein is of the nature of profiling or contour milling, that is, the work piece must be milled to a definite outline or contour, such contour often being irregular. Such operations require that the work table shall be moved very accurately and at the proper speed. The mechanism for controlling these functions is all located at the front of the machine directly under the control of the operator.

The motors can be operated in either direction from the switch 76. The rods 63, 64 and 63', 64' can be shifted to operate the work supporting elements at the desired speed, it being understood that ordinarily the direct drive (through the clutch 57) is for traversing and the lower speeds (through the clutch 58) are for feeding. The saddle screw 18 is directly connected to its transmission shaft 49' and the slide screw 19 and table operating shaft 22 can be optionally connected to the transmission shaft 49 by means of either of the handles 38.

In Fig. 8, I have shown a portion of a work piece W to be milled. The edge of the piece is to be milled back to the line marked a. The piece is secured to the work table with the center x thereof coaxial with the center of the table 6, the center x also being the center of the curved line a. The table is first moved to position the tool T up to the line a as shown. Rotary movement of the table in the direction of the arrow will thereafter operate to cut the circular portion a of the work piece. To cut the portions b and d, the slide 5 must be moved and to cut the portion c, the saddle 3 must be moved. These movements are all directly under the control of the operator through the switch 76 and other mechanism above described.

What I claim is:

1. In a machine tool, the combination of a bed, an upright thereon, tool supporting means on the upright, power means for operating the tool, a saddle longitudinally slidable on the bed, a slide transversely slidable on the saddle, a work table rotatably mounted on the slide, a screw for moving the saddle longitudinally, a second screw for moving the slide transversely, a shaft extending parallel with the second screw and operatively connected to the table for rotating the same, electric motor means, means including change speed gearing between the motor means and the screws and shaft whereby to selectively operate the saddle, slide and table, and a portable switch adjacent the table for controlling the motor means.

2. In a machine tool, the combination of a bed, an upright thereon, tool supporting means on the upright, power means for operating the tool, a saddle longitudinally slidable on the bed, a slide transversely slidable on the saddle, a work table rotatably mounted on the slide, a screw for moving the saddle longitudinally, a second screw for moving the slide transversely, a shaft extending parallel with the second screw and operatively connected to the table for rotating the same, electric motor means, means including change speed gearing between the motor means and the screws and shaft whereby to selectively operate the saddle, slide and table, means at the front of the machine for shifting the change speed gearing, and a switch at the front of the machine for controlling the motor means.

3. In a machine tool, the combination of a bed, an upright thereon, tool supporting means on the upright, power means for operating the tool, a saddle longitudinally slidable on the bed, a slide transversely slidable on the saddle, a work table rotatably mounted on the slide, a screw for moving the saddle longitudinally, a second screw for moving the slide transversely, a shaft extending parallel with the second screw and operatively connected to the table for rotating the same, a motor, means including change speed gearing operatively connecting the motor with the first named screw, a second motor, means including change speed gearing for operatively connecting the second motor with the second screw and shaft, and means for independently controlling the operation of the motors.

4. In a machine tool, the combination of a bed, an upright thereon, tool supporting means on the upright, power means for operating the tool, a saddle longitudinally slidable on the bed, a slide transversely slidable on the saddle, a work table rotatably mounted on the slide, a screw for moving the saddle longitudinally, a second screw for moving the slide transversely, a shaft extending parallel with the second screw and operatively connected to the table for rotating the same, a motor, means including change speed gearing operatively connecting the motor with the first named screw, a second motor, means including change speed gearing for operatively connecting the second motor with the second screw and shaft, and means at the front of the machine for shifting the change speed gearing and for controlling the motors.

5. In a machine tool, the combination of a bed, an upright thereon, tool supporting means on the upright, power means for operating the tool, a saddle longitudinally slidable on the bed, a slide transversely slidable on the saddle, a work table rotatably mounted on the slide, a screw for moving the saddle longitudinally, a second screw for moving the slide transversely, a shaft extending parallel with the scond screw and operatively connected to the table for rotating the same, gearing at the rear of the machine for operating the shaft and second screw, a motor, means including change speed gearing operatively connecting the motor with the first named screw, a second motor, means including change speed gearing operatively connecting the second motor with the first mentioned gearing, and shifting means at the front of the machine operative on the last said gearing to selectively connect the second screw and shaft with the second motor.

6. In a machine tool, the combination of a bed, an upright thereon, tool supporting means on the upright, power means for operating the tool, a member slidably supported by the bed, a work table rotatably supported by the member, a screw for sliding the member, a shaft for rotating the table, electric motor means, means including change speed gearing between the motor means and the shaft and screw whereby to operate the member and table, and a switch adjacent the table for controlling the motor means.

7. In a machine tool, the combination of a bed, an upright thereon, tool supporting means on the upright, power means for operating the tool, a member slidably supported by the bed, a work table rotatably supported by the member, a screw for sliding the member, a shaft for rotating the table, electric motor means, means including change speed gearing between the motor means and the shaft and screw whereby to operate the member and table, and a pendent switch hung from the upright to a position adjacent the table for controlling the motor means.

8. In a machine tool, the combination of a bed, an upright thereon, tool supporting means on the upright, power means for operating the tool, a member slidably supported by the bed, a work table rotatably supported by the member, a screw for sliding the member, a shaft for rotating the table, an electric motor, means including change speed gearing between the motor and the shaft and screw whereby to operate the member and table, means for optionally connecting the last said means to the shaft and screw, and a switch adjacent the table for controlling the motor.

In testimony whereof, I hereto affix my signature.

EDWARD H. WRAY.